United States Patent [19]

Sykes

[11] 4,178,042
[45] Dec. 11, 1979

[54] VARIABLE-TRACK WHEELS

[75] Inventor: Alec Sykes, Huddersfield, England

[73] Assignee: David Brown Tractors Limited, Huddersfield, England

[21] Appl. No.: 963,485

[22] Filed: Nov. 24, 1978

[30] Foreign Application Priority Data

Dec. 10, 1977 [GB] United Kingdom ............... 51505/77

[51] Int. Cl.² ............................................. B60B 23/12
[52] U.S. Cl. .................................... 301/9 TV; 301/16
[58] Field of Search ................ 301/9 TV, 11 S, 11 R, 301/16; 180/85

[56] References Cited

U.S. PATENT DOCUMENTS

| 3,586,381 | 6/1971 | Siegel | 301/9 TV |
| 3,885,834 | 5/1975 | Edwards et al. | 301/9 TV |

FOREIGN PATENT DOCUMENTS 832313  4/1960  United Kingdom ................. 301/9 TV

*Primary Examiner*—Charles A. Marmor

[57] ABSTRACT

Agricultural tractors having variable-track wheels for working in different conditions, particularly in row-crops, are known. The track-width of their driving wheels has sometimes been made power-adjustable by fixing brackets having respective grooves on the periphery of each hub and releasably clamping the brackets to respective helical rails fixed inside each rim and engaging the grooves. Due to the increasing size and power of tractors, and also to eventual wear of the components, it is difficult to achieve effective clamping. In an attempt to solve the problem, shims have been inserted where necessary between the brackets and the periphery of each hub. It is now proposed to solve the problem more positively by providing at least some of the brackets of each wheel with screws by which the brackets so provided can be adjusted in position radially of the hub before being fixed thereto.

8 Claims, 5 Drawing Figures

VARIABLE-TRACK WHEELS

BACKGROUND OF INVENTION

The invention relates to variable-track wheels, and more particularly to power-adjustable variable-track wheels for agricultural tractors or like vehicles.

One known type of such wheels comprises a hub having a cylindrical periphery, at least three brackets circumferentially spaced around and secured to the hub in contact with its cylindrical periphery, and a rim to which there are secured helical rails each of which is slideable in a groove in one of the brackets, each groove housing a block which is moveable into and out of clamping engagement with the associated rail by the rotation of an eccentric pin journalled in a bore formed in the bracket and intersecting the groove. The driving wheels on opposite sides of a vehicle usually have helical rails of the same hand for ease of manufacture, and the track-width is adjusted by moving the blocks on one of said wheels out of clamping engagement with the rails thereon, causing the driving axle of the vehicle to rotate in the appropriate direction so as to screw the rim of said one wheel towards or away from the longitudinal centre-line of the vehicle as required until one of the brackets on said wheel contacts a stop adjustably secured to the associated rail thereon, moving the blocks back into clamping engagement with the rails, and then repeating the procedure for the other driving wheel. Due to manufacturing tolerances and/or eccentricities in the hubs and rims, which increase as tractors and their driving wheels tend to become physically larger, and due also to the tendency for the torques required to be transmitted by the driving wheels to become higher, we have found that it is difficult to produce a wheel in which, even when new, the rim can be effectively clamped in adjusted position, and even more difficult to achieve effective clamping when the components have become worn by use. It has been proposed to remedy these difficulties by inserting shims where necessary between one or more of the brackets and the cylindrical periphery of the hub. The object of the invention is to provide means for more simply and positively enabling the position of one or more of the brackets radially of the hub to be adjusted prior to securing said bracket or brackets to the hub.

SUMMARY OF INVENTION

According to one aspect of the invention, in a bracket secureable to a hub having a cylindrical periphery, for connecting the hub to a helical rail secured to the rim of a power-adjustable variable-track wheel, and including a groove in which the rail is slideable and in which a block can be housed so as to be moveable into and out of clamping engagement with the rail by the rotation of an eccentric pin which can be journalled in a bore formed in the bracket and intersecting the groove, at least one screw-threaded hole is provided in the bracket and a screw can be disposed in the hole so as to be capable of abutting against the cylindrical periphery of the hub to enable the position of the bracket radially of the hub to be adjusted prior to securing the bracket to the hub.

According to another aspect of the invention, a power-adjustable variable-track wheel comprises a hub having a cylindrical periphery, at least three brackets circumferentially spaced around and secured to the hub, at least one of said brackets being as defined in the preceding paragraph, and a rim to which there are secured helical rails each of which is slideable and clampable in a groove in one of the brackets.

BRIEF DESCRIPTION OF DRAWINGS

A preferred embodiment of the invention will now be described, by way of example, with reference to the accompanying drawings of which.

DESCRIPTION OF PREFERRED EMBODIMENT

Figure 1:
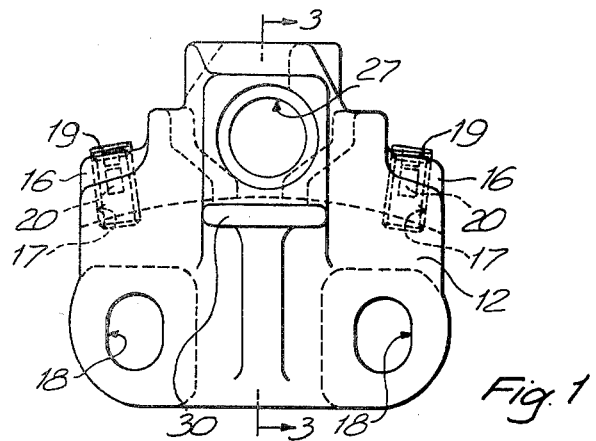
FIG. 1 is a side elevation of a radially adjustable bracket for connecting the hub of a wheel to a helical rail secured to the rim thereof.
Figure 2:
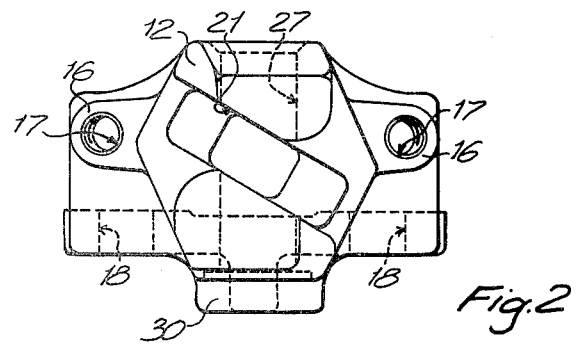
FIG. 2 is a plan view of said bracket.
Figure 3:
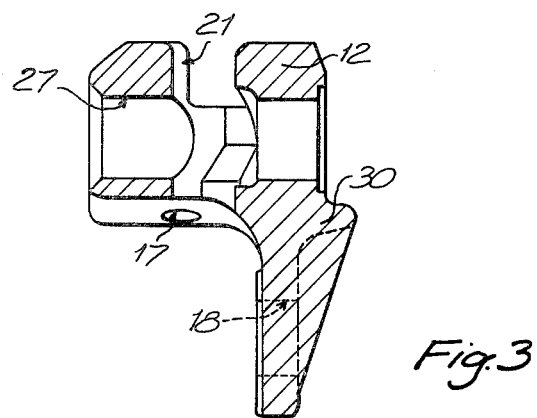
FIG. 3 is a section on the line 3—3 in FIG. 1.
Figure 4:
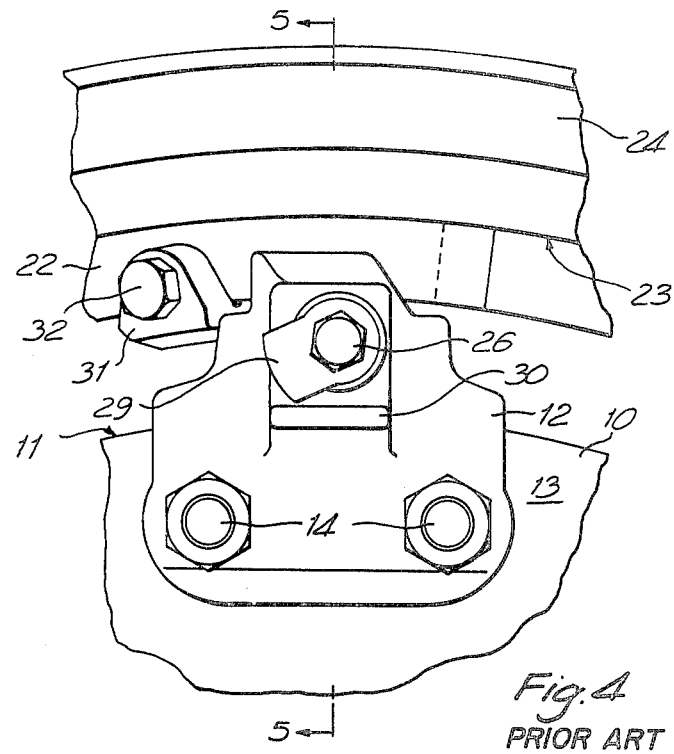
FIG. 4 is a side elevation of part of the wheel showing the hub, rail and rim connected by a known non-adjustable bracket.
Figure 5:
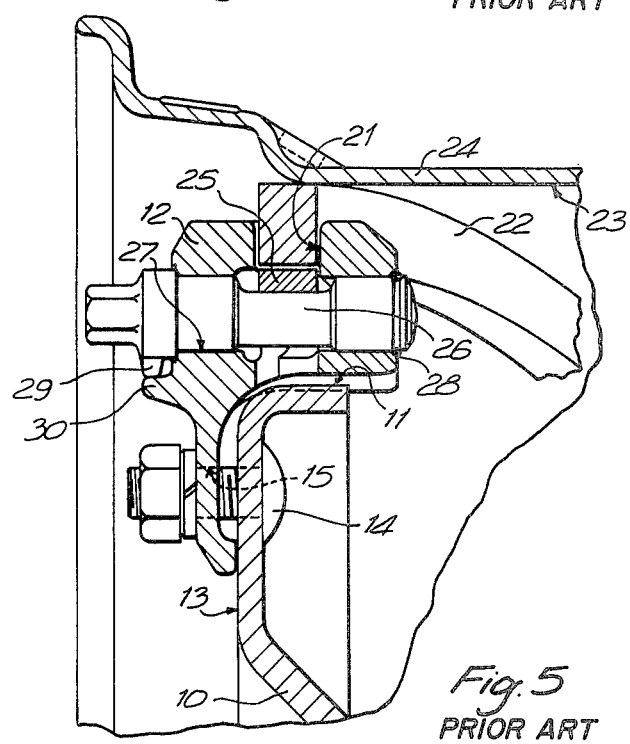
FIG. 5 is a section on the line 5—5 in FIG. 4.

Referring now to the drawings, a power-adjustable variable-track driving wheel for an agricultural tractor includes a pressed steel hub 10 adapted to be secured on a driving axle of the tractor and having a cylindrical periphery 11. At least three, and usually four or more, malleable cast iron brackets 12 are circumferentially spaced around the hub 10, and each bracket 12 is secured to a face 13 of the hub 10 perpendicular to its axis by two bolts 14. The majority of the brackets 12 are conventionally non-adjustable as shown in FIGS. 4 and 5, and have clearance holes 15 through which the bolts 14 pass. The non-adjustable brackets 12 contact the cylindrical periphery 11 of the hub 10 in the region of their circumferential ends but, as indicated in FIG. 5, not in the region of their circumferential mid-points. However, one of the brackets 12, where a total of four or five are provided, or each of two of the brackets 12, where six or more are provided, is made radially adjustable as shown in FIGS. 1-3 by the provision of two bosses 16, spaced apart circumferentially of the hub 10, in which there are formed respective screw-threaded holes 17 whose centre-lines converge so as to be disposed radially of the hub 10, and by the provision of parallel slots 18 in place of the holes 15. A self-locking screw 19, of the kind having a nylon insert 20 in its threaded periphery, is disposed in each of the holes 17 and abuts at its radially inner end against the cylindrical periphery 11 of the hub 10. Appropriate rotation of the self-locking screws 19 enables the position of the or each adjustable bracket 12 radially of the hub 10 to be simply and positively varied prior to securing said brackets to the hub 10, in order to compensate for any undue tolerances, eccentricities and/or wear which may be present in the components. Every bracket 12, whether or not adjustable as aforesaid, includes in known manner a groove 21 in which there is slideable a helical rail 22 secured to the inner periphery 23 of a pressed steel rim 24 on which a pneumatic tyre can be mounted, there being the same number of rails 22 as brackets 12. Each groove 21 houses a hardened steel block 25 which is moveable into and out of clamping engagement with the associated rail 22 by the rotation into and out of a slightly over-centre position of an eccentric pin 26 journalled in a bore 27 formed in the bracket 12 and intersecting the groove 21. The block 25 is shown out of clamping engagement wih the rail 22 in FIG. 5. Each pin 26 is retained in its associated bore 27 by a snap ring 28, and has a radially projecting lug 29 which can abut against a ridge 30 on the bracket 12 to limit rotation of the pin 26 in the clamping direction to the aforesaid slightly over-centre position in known manner. One of the rails 22 has a plurality of holes to enable a stop 31 to be adjustably secured thereto by a bolt 32 in order to limit relative sliding of the rails 22 and brackets 12 when the track-width of the tractor's driving wheels is being adjusted.

In a modification, due to the relatively large clearances provided between the grooves 21 and the rails 22, the or each adjustable bracket 12 can have a single boss 16 housing a single screw 19 at one of its circumferential ends, adjustment of the screw 19 causing the bracket 12 to pivot about the other of its circumferential ends which is in direct contact with the cylindrical periphery 11 of the hub 10.

The invention facilitates the adjustment in the field which is required to compensate for wear of the clamping components. It also provides means for limiting to an acceptable value the torque required to rotate the last eccentric pin 26 to be tightened. Furthermore, by appropriate positioning of the adjustable bracket or brackets 12 around the hub 10 it is possible to minimise eccentricity of the rim 24 with a view to conforming to British Standard 1495: Part 1:1970 in that respect.

I claim:

1. A bracket secureable to a hub having a cylindrical periphery, for connecting the hub to a helical rail secured to the rim of a power-adjustable variable-track wheel, and including a groove in which the rail is slideable and in which a block can be housed so as to be moveable into and out of clamping engagement with the rail by the rotation of an eccentric pin which can be journalled in a bore formed in the bracket and intersecting the groove, wherein at least one screw-threaded hole is provided in the bracket and a screw can be disposed in the hole so as to be capable of abutting against the cylindrical periphery of the hub to enable the position of the bracket radially of the hub to be adjusted prior to securing the bracket to the hub.

2. A bracket according to claim 1, wherein two screw-threaded holes are provided in respective bosses in the bracket, spaced apart circumferentially of the hub when the bracket is secured thereto, and a screw can be disposed in each hole.

3. A bracket according to claim 1, wherein the screw is self-locking.

4. A bracket according to claim 2, wherein each screw is self-locking.

5. A power-adjustable variable-track wheel comprising a hub having a cylindrical outer periphery, a rim having a cylindrical inner periphery spaced apart radially from said outer periphery, at least three helical rails circumferentially spaced around and secured to said inner periphery, and brackets secured to the hub, every bracket having a groove in which one of said rails is slideable and in which a block is housed so as to be moveable into and out of clamping engagement with the rail by the rotation of an eccentric pin journalled in a bore formed in the bracket and intersecting the groove, and at least one of the brackets having at least one screw-threaded hole in which there is disposed a screw which abuts against said outer periphery and thereby enables the position of the bracket radially of the hub to be adjusted prior to securing the bracket to the hub.

6. A wheel according to claim 5, wherein two screw-threaded holes are provided in respective bosses in the adjustable bracket, spaced apart circumferentially of the hub, and a screw is disposed in each hole.

7. A wheel according to claim 5, wherein the screw is self-locking.

8. A wheel according to claim 6, wherein each screw is self-locking.

* * * * *